United States Patent [19]
Maxwell et al.

[11] Patent Number: 5,715,912
[45] Date of Patent: Feb. 10, 1998

[54] INTEGRATED LUBRICATION SYSTEM USING SOLID OIL AND OIL MIST WITH A DEMISTER

[76] Inventors: John P. Maxwell, 1183 Portsmouth Rd., Rochester Hills, Mich. 48309; Vernon F. Stone, 1511 Carroll Ave., Ames, Iowa 50010

[21] Appl. No.: 722,426

[22] Filed: Oct. 1, 1996

[51] Int. Cl.$^6$ .................................................. F01M 1/00
[52] U.S. Cl. ........................ 184/6.26; 184/6.12; 74/467
[58] Field of Search ............................. 184/6.26, 6.12, 184/55.1; 74/467

[56] References Cited

U.S. PATENT DOCUMENTS

| | | | |
|---|---|---|---|
| 2,664,173 | 12/1953 | Karig | 74/467 |
| 4,717,000 | 1/1988 | Waddington | 184/6.26 |
| 5,154,259 | 10/1992 | Magome | 184/55.1 |
| 5,253,733 | 10/1993 | Miyachi | 184/6.26 |

*Primary Examiner*—Thomas E. Denion

[57] ABSTRACT

The subject invention is an improved lubrication system which supplies oil mist under pressure to externally inaccessible bearings and gears as well as supplying solid oil to externally accessible bearings, both from a single source. Both solid oil and oil mist are provided by use of conventional components. The system operates from power supplied by plant air and electricity. The subject invention employs a demister system, new to the art, which enhances the consolidation of oil particles within the gear housing, or other enclosures of moving parts to be lubricated. It reduces the amount of oil mist exhausted while retaining the benefits of a pressurized system to keep out contaminants and improves the health quality of the working environment.

1 Claim, 1 Drawing Sheet

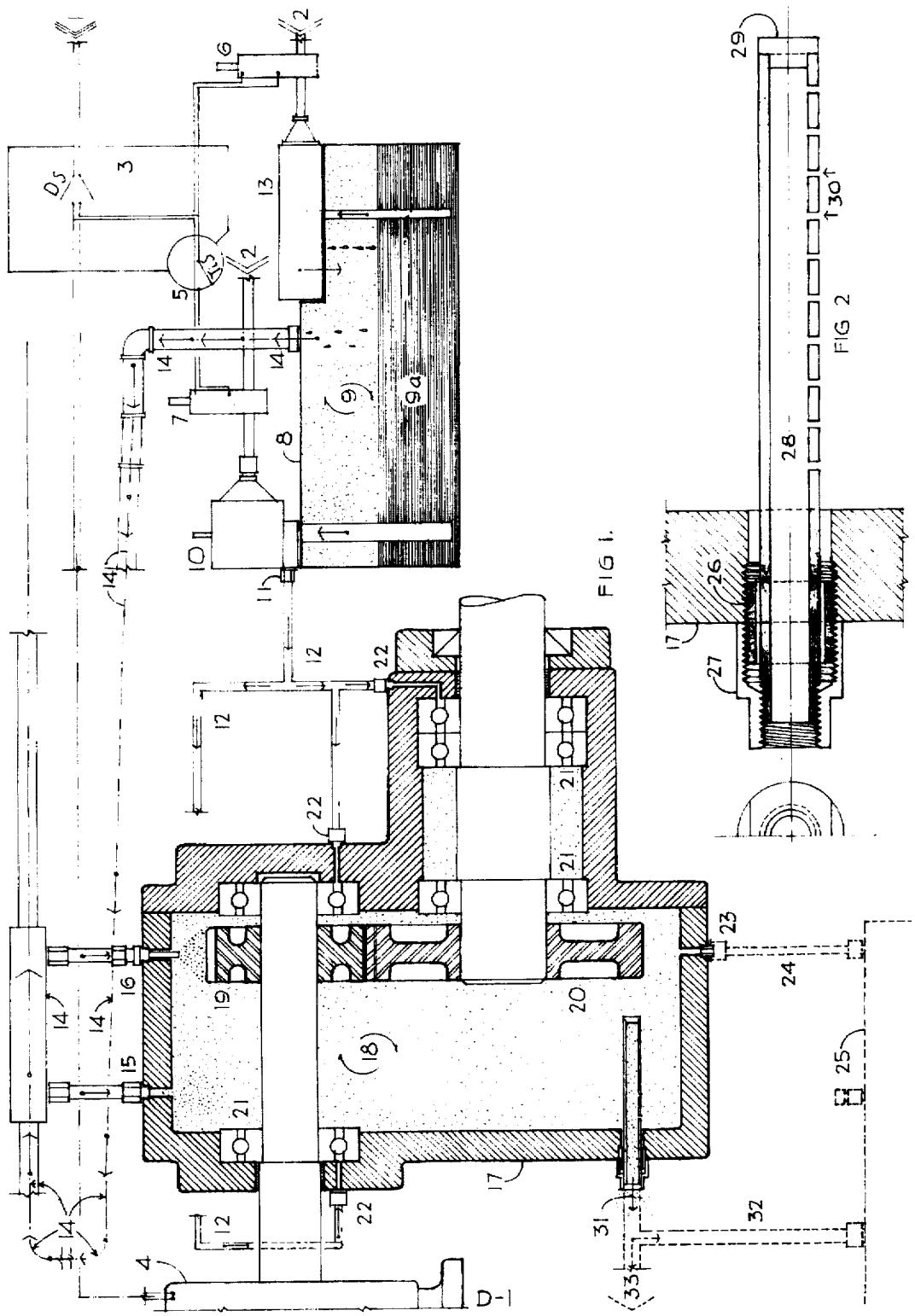

INTEGRATED LUBRICATION SYSTEM USING SOLID OIL AND OIL MIST WITH A DEMISTER

RELATED APPLICATIONS

None of the known systems provide a single source for solid oil and oil mist and none uses a demister to reduce the amount of oil mist and oil particles ejected into the machine ambiance.

BACKGROUND OF THE INVENTION

Oil mist is an atomized oil carried in air under low pressure. Oil mist applied to bearings and gears is a technique employed in the art of lubrication. The subject invention uses solid oil for accessible bearings and oil mist for housed gears and bearings in a common system, and also uses a demister which improves air quality around machinery. Heretofore, demisters have not been installed in gear housings, and solid oil and oil mist have not been supplied from a common tank.

SUMMARY OF THE INVENTION

The subject invention consists of two aspects of one system which also includes various conventional components. One aspect is a demister which enhances the consolidation of oil particles within the gear housing and reduces the amount of oil mist exhausted from the housing, thus providing a cleaner ambiance at the machinery, a concern of OSHA and State regulations. The other aspect is the provision of a system capable of supplying both solid oil and oil mist from the same tank using a conventional air-powered oil pump controlled by a timer switch, and a conventional oil mist generator. Other conventional components include piping, fittings, connections, etc.

DETAILED DESCRIPTION OF THE INVENTION AND DRAWING—FIG. 1 and 2

FIG. 1 is a diagram of an integrated lubrication system for a housed set of gears transporting power to an operating spindle. This drawing shows power sources, oil mist generation and distribution, solid oil distribution controls, and the demister. FIG. 2 is a full-size detail of a demister The elements of this invention include an oil mist generator (13) mounted in a tank (8) using oil (9a) and an oil pump (10) mounted in the same tank (8). The line or pipe (14) convey the oil mist (9) thru the pipe manifold (14) to the mist fitting (15) which fills the gear box cavity (18). This mist lubricates bearings (21) not lubricated by oil pump (10). The oil pump (10) supplies solid oil from (9a) thru outlet fitting (11) connecting line (12) to injectors (22) to supply metered amounts of oil to the bearings. Spray mist out of fitting (16) lubricates the gears (19) and (20) with mist from manifold (14). Oil mist (18) is expelled in the form of heavy oil particles and solid oil out the demister (31) into the atmosphere providing a cleaner environment for the personnel involved. The gear box (17) is drained of any oil solids and contaminates out (23) thru line (24) into the collector tank (25) to be reused or discarded by the user.

The Operation Sequence is as Follows:

Plant air from air line (2) is turned on with an air solenoid (16) operated by a machine timer or controller (3) electrially to provide the air pressure to produce mist in the generating head (13) which fills the top portion of the oil tank (8) with mist (9) under pressure, the controller also starts motor (4) turning the gears to operate the machine spindle box (17) at the same time. The controller (3) also opens solenoid (7) supplying air from line (2) into the piston pump (10) drawing the same oil up and out fitting (11) connected to line (12) in which solid oil flows to injector (22) to lubricate bearing connected to the lines (12) the air solenoid (7) turns off after a preset time in which the injectors are operated and are programmed to turn on again the, usually every 15 to 30 minutes as needed, to provide the oil film for the bearing (21). The oil mist generating head solenoid (16) is open driving the motor operation and shut off when motor is stopped. This provides constant lubrication to the gear train and oily bearings not connected to the solid oil lines (22).

The demister (28) is designed using tubing plugged (29) with vent holes (30) sized for the amount of oil mist used. The number and sizes are selected to provide twice the outlet of air as used in the total inlets fittings (15), (16). This method of sizing provides a slight back pressure to keep out contaminants.

Pipe nipples (26) connected to reducer (27) permit easy removal of demister from head (17) for inspection, design changes or cleaning. Threads in the reduces(27) connected to line (31), (33) and (32) for flow to the atmosphere or the collector tank.

The result will be loss of oil mist used, and the air oil mist discharged out the demister will consist of a large percentage of large particles of oil, in place of the small hazardous particles.

What is claimed is:

1. An integrated lubrication system for providing two-phase lubrication at different points of a machine, said system comprising;

a housing having machine components therein, said components being supported by bearings, a tank containing lubricant, an oil mister generator mounted on said lubricant tank, a first pipe carrying oil mist from said oil mist generator to at least one mist fitting mounted on said machine housing, for application to said machine components therein, a second pipe carrying liquid lubricant from said oil pump to at least one oil injector mounted on said machine housing adjacent to at least one of said bearings, a demister having two flow branches, said demister being mounted near a bottom of said machine housing for coalescing said oil mist into condensate, and depositing said condensate via said first flow branch into a collector tank, said second flow branch of said demister communicating into the atmosphere for expelling de-misted air thereinto, and a drain line disposed in a bottom of said machine housing and communicating with said collector tank for collecting used oil solids and contaminates from said machine housing.

* * * * *